(12) United States Patent
Girard et al.

(10) Patent No.: US 11,326,468 B2
(45) Date of Patent: May 10, 2022

(54) METHODS AND SYSTEMS FOR OPERATING A GAS TURBINE ENGINE

(71) Applicant: PRATT & WHITNEY CANADA CORP., Longueuil (CA)

(72) Inventors: Gaetan Girard, Outremont (CA); Stephane Wirth, Longueuil (CA); Justin Bauslaugh, Toronto (CA); Francesco Finzi-Contini, Longueuil (CA); Mehmet Celal Tanju, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 144 days.

(21) Appl. No.: 16/678,814

(22) Filed: Nov. 8, 2019

(65) Prior Publication Data

US 2021/0140338 A1    May 13, 2021

(51) Int. Cl.
*G01M 15/14* (2006.01)
*F01D 21/00* (2006.01)

(52) U.S. Cl.
CPC ........ *F01D 21/003* (2013.01); *F05D 2260/80* (2013.01); *G01M 15/14* (2013.01)

(58) Field of Classification Search
CPC ... F01D 21/003; F05D 2260/80; G01M 15/14
See application file for complete search history.

(56) References Cited

U.S. PATENT DOCUMENTS

| | | | |
|---|---|---|---|
| 6,898,939 B2 | 5/2005 | Busch | |
| 7,072,761 B2 | 7/2006 | Hawkins et al. | |
| 10,345,195 B2 | 7/2019 | Das et al. | |
| 2003/0056492 A1 | 3/2003 | Henson | |
| 2010/0138132 A1* | 6/2010 | Apps | G07C 3/08 701/100 |
| 2013/0199204 A1* | 8/2013 | Camhi | F02C 9/00 60/779 |
| 2018/0038284 A1 | 2/2018 | Patry et al. | |
| 2018/0283293 A1 | 10/2018 | Schwulst et al. | |
| 2018/0297718 A1* | 10/2018 | Adibhatla | G07C 5/008 |
| 2020/0355368 A1* | 11/2020 | Angello | F02C 9/28 |
| 2021/0254558 A1* | 8/2021 | Morris | B64D 45/00 |

* cited by examiner

*Primary Examiner* — Eric S. McCall
(74) *Attorney, Agent, or Firm* — Norton Rose Fulbright Canada LLP

(57) ABSTRACT

Methods and systems for operating a gas turbine engine are provided. A health parameter for the gas turbine engine is monitored at a health evaluation device via a first instrument, the health evaluation device being communicatively coupled to a communication link established between a controller, associated with the gas turbine engine, and a second instrument which provides the controller with an operation parameter indicative of an operating condition of the gas turbine engine. The health parameter is compared to a predetermined threshold. When the health parameter is beyond the predetermined threshold, a signal is injected into the communication link to produce a predetermined value for the operation parameter to elicit a health response from the controller associated with the predetermined value.

20 Claims, 8 Drawing Sheets

METHODS AND SYSTEMS FOR OPERATING A GAS TURBINE ENGINE

TECHNICAL FIELD

The present disclosure relates generally to gas turbine engines, and more specifically to monitoring the health of gas turbine engines.

BACKGROUND OF THE ART

During operation, an engine outputs energy in a variety of ways: though the primary goal can be to cause the rotation of a shaft or other element, the engine also creates sound, heat, and vibrations, all of which are forms of waste energy, and which can damage and/or degrade the performance of the engine. Operating parameters for the engine can be monitored, including waste-energy-related parameters, to determine whether engine failure or a need for engine maintenance is imminent.

However, some gas turbine engines may not be configured for measuring and/or analyzing certain operating parameters of the engine. As a result, information relating to imminent engine failure and/or a need for engine maintenance can go ignored.

Therefore, improvements are needed.

SUMMARY

In accordance with a broad aspect, there is provided a method for operating a gas turbine engine. A health parameter for the gas turbine engine is monitored at a health evaluation device via a first instrument, the health evaluation device being communicatively coupled to a communication link established between a controller, associated with the gas turbine engine, and a second instrument which provides the controller with an operation parameter indicative of an operating condition of the gas turbine engine. The health parameter is compared to a predetermined threshold. When the health parameter is beyond the predetermined threshold, a signal is injected into the communication link to produce a predetermined value for the operation parameter to elicit a health response from the controller associated with the predetermined value.

In accordance with another broad aspect, there is provided a system for operating a gas turbine engine. The system comprises: a first instrument coupled to the gas turbine engine and configured for measuring a health parameter of the gas turbine engine; a second instrument coupled to the gas turbine engine and configured for measuring an operation parameter of the gas turbine engine; a communication link coupling the second instrument to a controller associated with gas turbine engine to provide the operation parameter to the controller; and a health evaluation device communicatively coupled to the first instrument to obtain the health parameter, and communicatively coupled to the communication link to inject a signal into the communication link, in response to detecting that the health parameter is beyond a predetermined threshold, to produce a predetermined value for the operation parameter to elicit a health response from the controller associated with the predetermined value.

In accordance with a further broad aspect, there is provided a health evaluation device for a gas turbine engine. The health evaluation device comprises an input connectable to a first instrument for obtaining therefrom a health parameter for the gas turbine engine; an output connectable to a communication link established between a controller, associated with the gas turbine engine, and a second instrument which provides the controller with an operation parameter indicative of an operating condition of the gas turbine engine; and a processing circuit coupled to the input and to the output. The processing circuit is configured for: monitoring the health parameter; comparing the health parameter to a predetermined threshold; and when the health parameter is beyond the predetermined threshold, injecting a signal into the communication link via the output to produce a predetermined value for the operation parameter to elicit a health response from the controller associated with the predetermined value.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
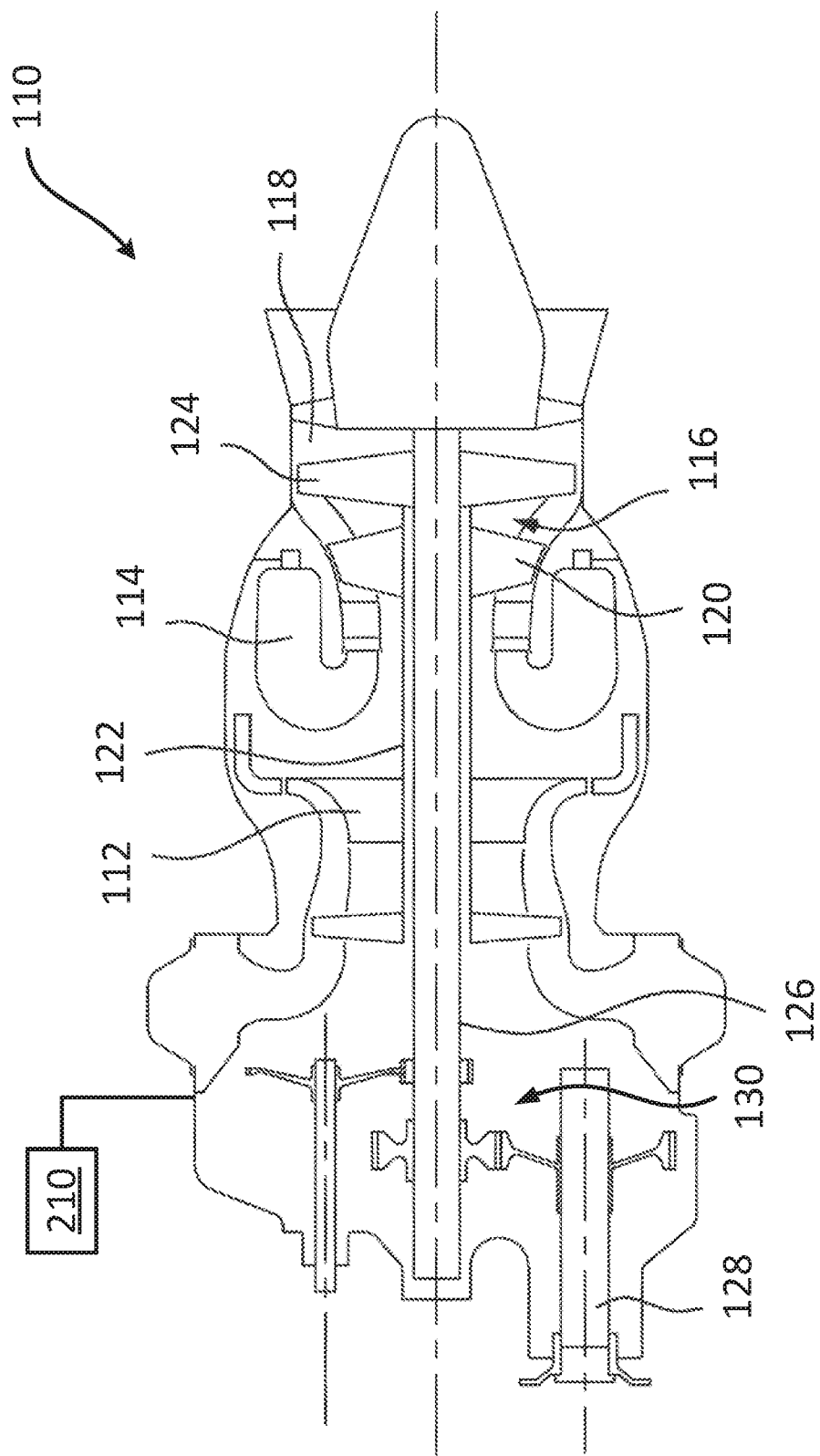
FIG. 1 is a schematic cross-sectional view of an example gas turbine engine.

FIG. 1 illustrates a gas turbine engine 110. In some embodiments, the engine 110 is use for of a type preferably provided for use in subsonic flight, generally comprising in serial flow communication, a compressor section 112 for pressurizing the air, a combustor 114 in which the compressed air is mixed with fuel and ignited for generating an annular stream of hot combustion gases, and a turbine section 116 for extracting energy from the combustion gases. The combustion gases flowing out of the combustor 114 circulate through the turbine section 116 and are expelled through an exhaust duct 118. The turbine section 116 includes a compressor turbine 120 in driving engagement with the compressor section 112 through a high pressure shaft 122, and a power turbine 124 in driving engagement with a power shaft 126. The power shaft 126 is in driving engagement with an output shaft 128 through a gearbox 130, which may be a reduction gearbox. The engine 110 may be equipped with one or more sensors, which may measure pressure, temperature, speed, angular velocity, torque, and the like. A controller 210 can be coupled to the engine 110 for acquiring information from the sensors and/or from an operator via various inputs, and for controlling operation of the engine 110 based thereon. The controller 210 can be a full-authority digital engine controls (FADEC) or other similar device, including electronic engine control (EEC), engine control unit (ECU), and the like.

Although illustrated as a turboshaft engine, the engine 110 may alternatively be another type of engine, for example a turbofan engine, also generally comprising, in serial flow communication, a compressor section, a combustor, and a turbine section, and a fan through which ambient air is propelled. A turboprop engine may also apply. In addition, although the sensor-related applications discussed herein pertain primarily to the engine 110 and flight applications, it should be understood that other uses, such as industrial, commercial, or the like, may apply. For example, the techniques described herein could be applied to other types of machines or devices which experience vibration in one form or another.

In operation, vibrations can be produced by one or more rotating components of the engine 110 which affect the engine 110 itself and other components to which the engine 110 is coupled. In embodiments in which the engine 110 is configured for causing rotation of a propeller, which may be external to the engine, the propeller can also cause vibrations which affect the engine 110. Generally speaking, the vibrations produced by the engine 110 are a result of the rotational motion of various components within the engine, including the shafts 122, 126, 128. Although a certain degree of vibration is expected, and indeed normal, levels of vibration which exceed certain thresholds can cause damage to the engine 110, or to other components to which the engine 110 is coupled.

In some cases, the engine 110 is not originally provided with any dedicated vibration sensor, whether coupled to the engine 110 itself or coupled to other elements (e.g., a propeller). Also, in some cases, the controller 210 is configured for interfacing with a variety of sensors (which can include temperature sensors, pressure sensors, fluid level sensors, speed, sensors, and the like), but is not originally configured for interfacing with any type of dedicated vibration sensor. Thus, even if a vibration sensor were to be added to the engine 110, the controller 210 may not be capable of processing any information provided by the vibration sensor, without requiring a complete retrofit of the controller 210 and possibly any associated sensor suite.

Figure 2:
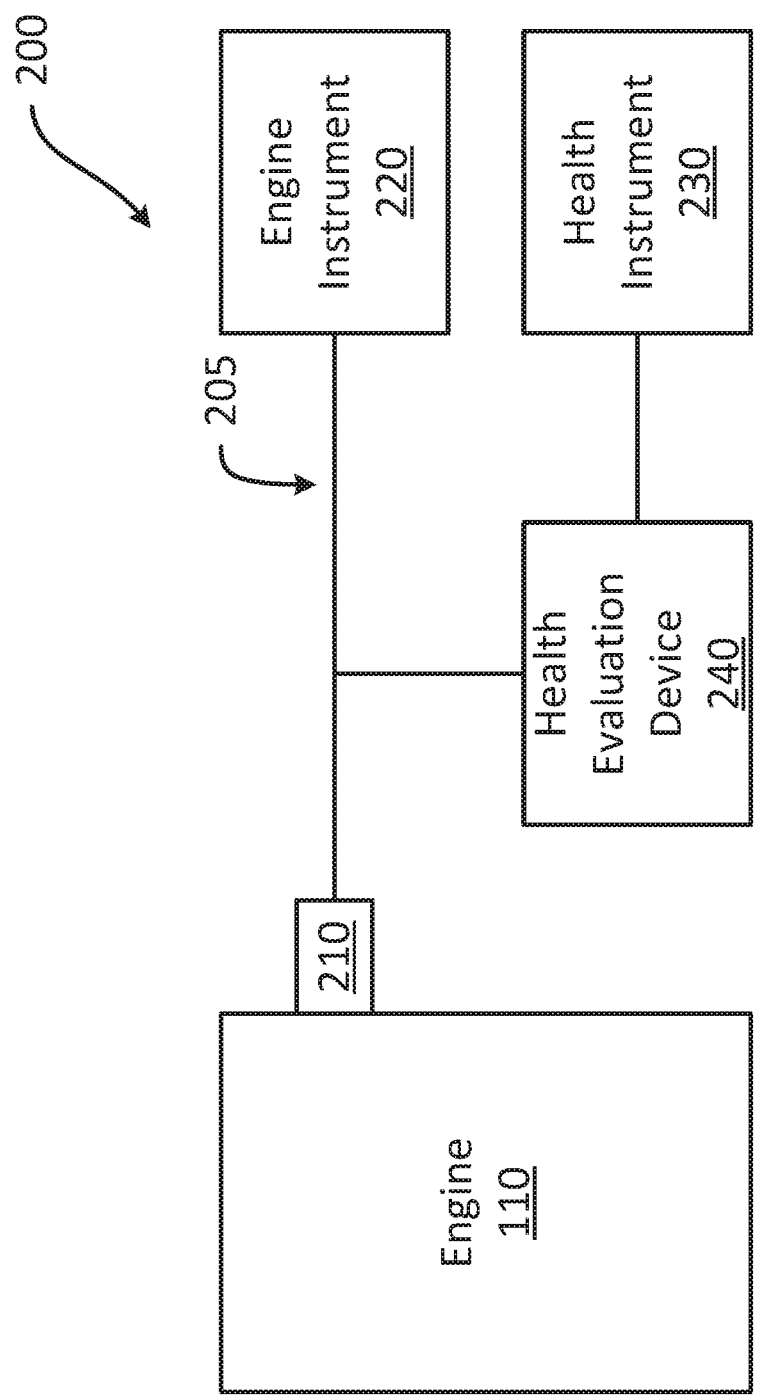
FIG. 2 is a block diagram of an example engine health monitoring system.

With reference to FIG. 2, there is illustrated a system 200 for monitoring the health of a gas turbine engine, for instance the engine 110. As illustrated in FIG. 2, the engine 110 is coupled to the controller 210. It should be noted that although FIG. 2 illustrates the controller 210 as being a separate entity from the engine 110, in some embodiments the controller 210 is substantially integrated with the engine 110.

Coupled to the controller 210 is an engine instrument 220, which is configured for providing the controller 210 with an operation parameter indicative of an operating condition of the engine 110. In some embodiments, the engine instrument 220 is a sensor, for instance a pressure sensor, an oil pressure sensor, a fluid level sensor, a temperature sensor, a speed sensor, or the like, and the operating parameter can be an ambient air pressure, an oil reservoir pressure, a fuel reservoir level, an engine operating temperature, an output shaft speed, and the like. In some other embodiments, the engine instrument 220 is a so-called "soft sensor" (sometimes referred to as a "virtual sensor"), which refers to an output of a controller, instrument, or other device, and can be based on values from one or more other sensors. Still other embodiments are considered. For example, in some cases, the engine instrument 220 is part of the engine 110, or part of the controller 210.

The controller 210 and the engine instrument 220 are coupled to one another via a communication link 205. The communication link 205 can be of any suitable length, and can be composed of any suitable number of wired and/or wireless networking elements. In some embodiments, the communication link 205 consists of one or more electrical wires. For example, the communication link 205 includes part or all of an engine harness of the engine 110. The engine harness can include various wires, cables, and other electrical connectors and transmission devices for carrying electrical power and signals (whether analog or digital) between the engine 110, the controller 210, and other elements, including the engine instrument 220. In some other embodiments, the communication link 205 consists of one or more wireless connections, bridges, and the like. In some further embodiments, the communication link 205 is composed of both wired and wireless connections, bridges, and the like.

With continued reference to FIG. 2, the system 200 also includes a health instrument 230 and a health evaluation device 240. The health instrument 230 is coupled to the health evaluation device 240, and is configured for measuring a health parameter for the gas turbine engine. In some embodiments, the health instrument 230 is configured for measuring a level of vibration within, or in the vicinity of, the engine 110. In some other embodiments, the health instrument is configured for measuring another health parameter for the gas turbine engine. For example, the health instrument can measure an ambient pressure in a vicinity of the engine 110, an in-engine air pressure at one or more locations within the engine 110, an ambient temperature in the vicinity of the engine 110, an internal temperature at one or more locations within the engine 110, a noise level at one or more locations within the engine 110, a strain level for one or more components of the engine 110, a speed, angular velocity, and/or acceleration for one or more components of the engine 110, and the like. The health parameter can be any suitable value indicative of an operating condition of the engine which is indicative of a health state of the engine 110.

The health evaluation device 240 is coupled to the health instrument 230 to receive therefrom the health parameter. For example, the health evaluation device 240 receives data indicative of the level of vibration detected by the health instrument 230. In another example, the health evaluation device 240 receives data indicative of a mode of vibration detected by the health instrument 230, or some other indication of the type of vibrations detected by the health instrument 230. In other embodiments, the health evaluation device 240 obtains other data from the health instrument 230, which is indicative of the health parameter.

The health evaluation device 240 is also coupled to the communication link 205. In the embodiment depicted in FIG. 2, the health evaluation device 240 has an input, which is coupled to the health instrument 230, and an output, which is coupled to the communication link 205. In some other embodiments, the health evaluation device 240 can include more inputs and/or outputs, as appropriate. As will be described in greater detail hereinbelow, in other embodiments, the health evaluation device 240 can be coupled to the communication link 205 in other ways.

The health evaluation device 240 is configured for monitoring the health parameter obtained from the health instrument 230. In some embodiments, the health evaluation device 240 substantially continuously monitors the health parameter. In some other embodiments, the health evaluation device 240 monitors the health parameter periodically, for instance once every few minutes, once every few seconds, several times per second, or the like.

The health evaluation device 240 is also configured for comparing the health parameter to a predetermined health threshold associated with the health parameter. In the case of a vibration level, the vibration threshold can be set as a maximum rate of acceleration for the vibration, a maximum level of displacement for the engine 110 along any suitable axis, or the like. In cases in which the health parameter is a different value, the health evaluation device can use a different health threshold. The health threshold can be based on established regulations, for instance instituted by a manufacturer or a regulatory body, or the like.

When the health parameter is beyond the health threshold, the health evaluation device 240 is configured for injecting a signal onto the communication link 205. The injected signal causes the operation parameter, as provided by the engine instrument 220 to the controller 210, to take on a predetermined value to elicit a health response from the controller 210. Put differently, the signal injected by the health evaluation device 240 mimics an operation parameter that would be provided by the engine instrument 220; specifically, the injected signal mimics an operation parameter from the engine instrument 220 that causes the controller 210 to adjust the operation of the engine 210 in some fashion, in order to preserve or improve the health of the engine 110.

For example, the engine instrument 220 is an oil pressure sensor, which reports an oil pressure value to the controller 210. The health evaluation device 240 is coupled to a vibration sensor (which embodies the health instrument 230), and monitors a level of vibration within the engine 110. The engine 110, however, is not otherwise provided with a vibration sensor, and the controller 210 is not configured for receiving a vibration signal. When the health evaluation device 240 determines that the level of vibration within the engine 110 is above a predetermined safe vibration threshold, the health evaluation device 240 injects a signal onto the communication link 205 which supersedes the signal that the oil pressure sensor typically provides to the controller 210, containing the operation parameter. In particular, the health evaluation device 240 injects a signal which produces a value for the oil pressure indicative of imminent failure of the engine 110, for instance due to an oil pressure value which is above a rated maximum value for the engine 110. In response to receiving the injected signal, the controller 210 implements a health routine for the engine 110, which can include shutting down the engine, reducing a level of fuel flow to the engine, or the like.

By providing the injected signal onto the communication link for transmission to the controller 210, the health evaluation device 240 can elicit particular responses from the engine 110, by way of the controller 210, based on data obtained from the health instrument, which is not regularly available to the controller 210. The health evaluation device 240 provides information obtained by the health instrument 230 to the controller 210 by mimicking an operation parameter that would normally be provided by the engine instrument 220. In this fashion, the capabilities of the controller 210 can be augmented without requiring recoding or retrofitting of the controller 210 itself, or of the suite of instruments used by the controller 210.

In some embodiments, the health evaluation device 240 can inject different signals onto the communication link 205 to elicit different responses from the controller 210. For instance, a first injected signal can elicit a alert-type response from the controller 210, which can result in an alert being raised for an operator of the engine 110, and a second injected signal can elicit an engine shutdown response, or a reduction in engine power output, for instance by reducing a fuel flow to the engine 110. The health evaluation device 240 can compare the health parameter, as obtained from the health instrument 230, against a variety of different health thresholds, and select the signal to inject based on how the health parameter compares to the different health thresholds. Alternatively, or in addition, the system 200 can include multiple health instruments 230, and the health evaluation device 240 can compare a variety of health parameters against one or more associated health thresholds, then select a signal to inject accordingly.

In some embodiments, the system 200 includes more than one engine instrument 220, and the health evaluation device 240 can inject signals associated with different engine instruments 220, for instance to raise different health responses from the controller 210 associated with different operation parameters. For example, the system 200 can include an oil pressure sensor and a temperature sensor. The health evaluation device 240 can inject a signal superseding the oil pressure signal to elicit a shutdown response from the controller 210, and can inject a signal superseding the temperature signal to issue an alert or power reduction response from the controller 210. Other embodiments are also considered.

In some other embodiments, the system 200 includes more than one health evaluation device 240, which can be coupled to one or more health instruments 230, and which can inject signals onto the communication link 205 for one or more different engine instruments. In one example, multiple health evaluation devices 240 are each associated with respective health instruments 230, and are each configured for injecting signals onto the communication link 205 to produce values for operation parameters of different engine instruments 220. In another example, multiple health evaluation devices 240 are coupled to one or more shared health instrument 230, and are each configured for injecting signals onto the communication link 205 to produce values for operation parameters of different engine instruments 220. In some instances, the health instrument 230 for a first health evaluation device 240 is a second, different health evaluation device 240, such that the output of second health evaluation device 240 is provided to the first health evaluation device 240 for monitoring. In a further example, multiple health evaluation devices 240 are configured for injecting signals onto the communication link 205 for operation parameters of one or more common engine instruments. For instance, a first health evaluation device 240 injects a signal to produce an operation parameter of an engine instrument 220 associated with a warning, and a second health evaluation device 240 injects a signal to produce an operation parameter, of the same engine instrument 220, which is associated with an engine shutdown.

In some embodiments, the injected signal modifies a signal issued by the engine instrument 220 to produce the predetermined value for the operation parameter. For example, if the engine instrument 220 provides the operation parameter to the controller 210 via an analog signal, the signal injected by the health evaluation device 240 is shaped to interfere with the signal issued by the engine instrument 220 to produce the predetermined value for the operation parameter.

In some other embodiments, the injected signal includes a priority flag or other indication which causes the value for the operation parameter of the injected signal to supersede the operation parameter as provided by the engine instrument 220. For example, if the engine instrument 220 issues the operation parameter as a digital signal which includes a priority bit (e.g., set to '0' for low priority, and set to '1' for high priority), the signal injected by the health evaluation device 240 has its priority bit set to high priority, to indicate that the injected signal should supersede the operation parameter provided by the engine instrument 220.

Other approaches are also considered. For instance, as described in greater detail hereinbelow, the health evaluation device 240 can be positioned so as to intercept or block the operation parameter issued from the engine instrument 220, and to inject a replacement signal for the controller 210.

In some embodiments, the health evaluation device 240 is composed of a variety of circuit elements, including basic circuit elements, amplifiers, filters, transistors, other logic components, and the like. In some other embodiments, the health evaluation device 240 is composed of a microcontroller and/or other logic-based circuit elements. In some further embodiments, the health evaluation device 240 is composed of one or more computing devices which execute software for obtaining the health parameter from the health instrument 230, comparing the health parameter to the health threshold, and for injecting the signal onto the communication link 205.

In some embodiments, the health instrument 230 and the health evaluation device 240 are provided separately or jointly as an aftermarket addition to the system 200. For example, the engine 110 is operated in the context of an aircraft, which already includes the engine 110, the controller 210, the engine instrument 220, and the communication link 205. The health instrument 230 and the health evaluation device 240 are then added to the aircraft as a retrofit or as an upgrade, to provide the additional functionality to the controller 210 without necessitating a complete replacement or overhaul of the controller 210. For instance, the communication link 205 represents the engine harness of the engine 110, and the health evaluation device 240 can be connected to, integrated in, or otherwise communicatively coupled to, the controller 210 via the engine harness: an input of the health evaluation device 240 can be connected to the health instrument 230, and an output of the health evaluation device 240 can be connected to the engine harness.

In some other embodiments, the health instrument 230 may already be part of the system 200 when the health evaluation device 240 is added to the aircraft or other system. For example, the health instrument 230 may already be coupled to the controller 210, for instance via the communication link 205, but the controller 210 may not be configured for monitoring the data from the health instrument 230 to produce certain health responses. The health evaluation device 240 can be used to monitor the data produced by the health instrument 230, and to inject a signal onto the communication link 205 to produce an operation parameter for the engine instrument 220 in order to produce a desired health response from the controller 210.

Figure 3:
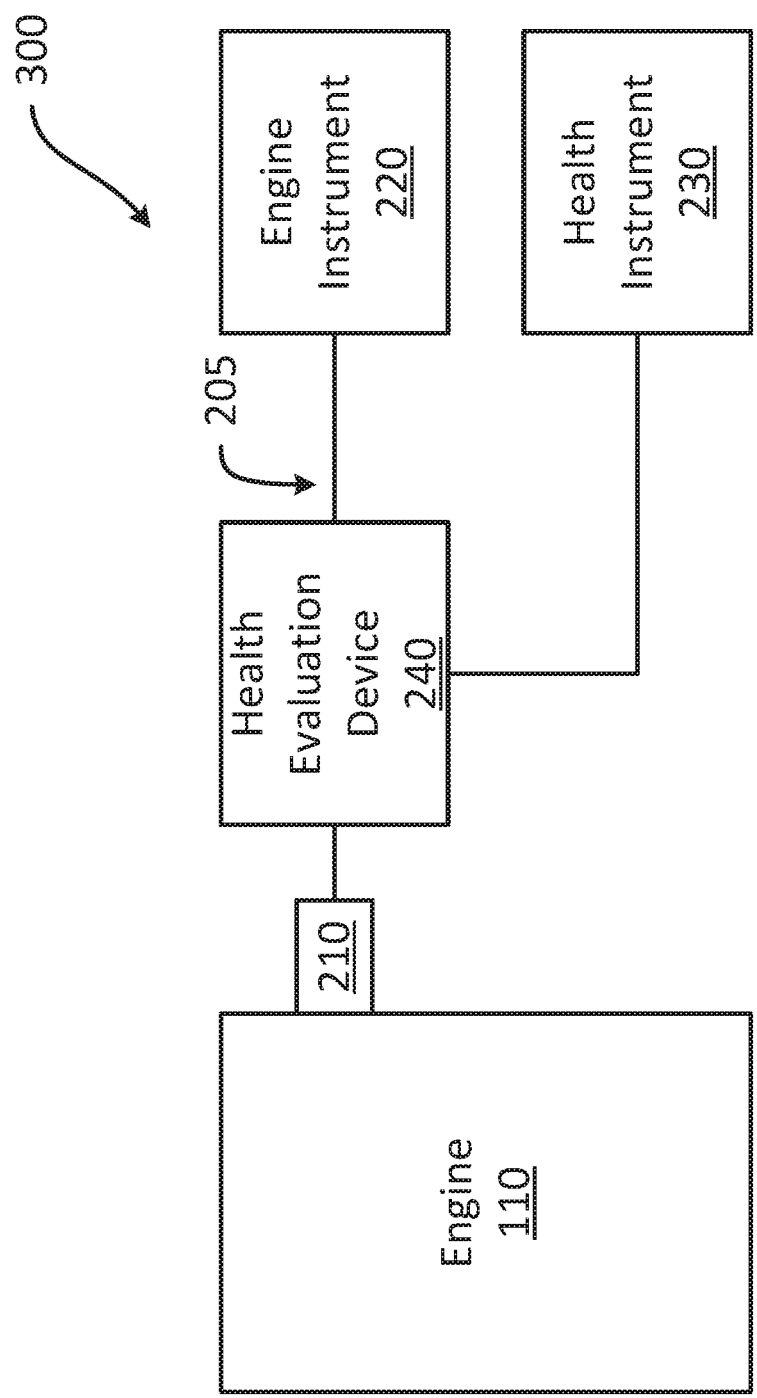
FIGS. 3-6 are block diagrams example variants of the engine health monitoring system of FIG. 2.

With reference to FIG. 3, there is illustrated a variant system 300 for monitoring the health of the engine 110. In the embodiment of FIG. 3, the health evaluation device 240 is positioned within the communication link 205, between the controller 210 and the engine instrument 220. For example, the health evaluation device 240 can be integrated into the engine harness for the engine 110, which forms at least part of the communication link 205. The health evaluation device 240 can be configured for receiving the operation parameter provided by the engine instrument 220, and for selectively passing along the operation parameter from the engine instrument 220 to the controller 210 when the health parameter provided by the health instrument 230 is not beyond the health threshold. When the health parameter is beyond the health threshold, the health evaluation device 240 can block the operation parameter from the engine instrument 220, and inject a signal onto the communication link 205 to elicit the health response from the controller 210.

Figure 4:
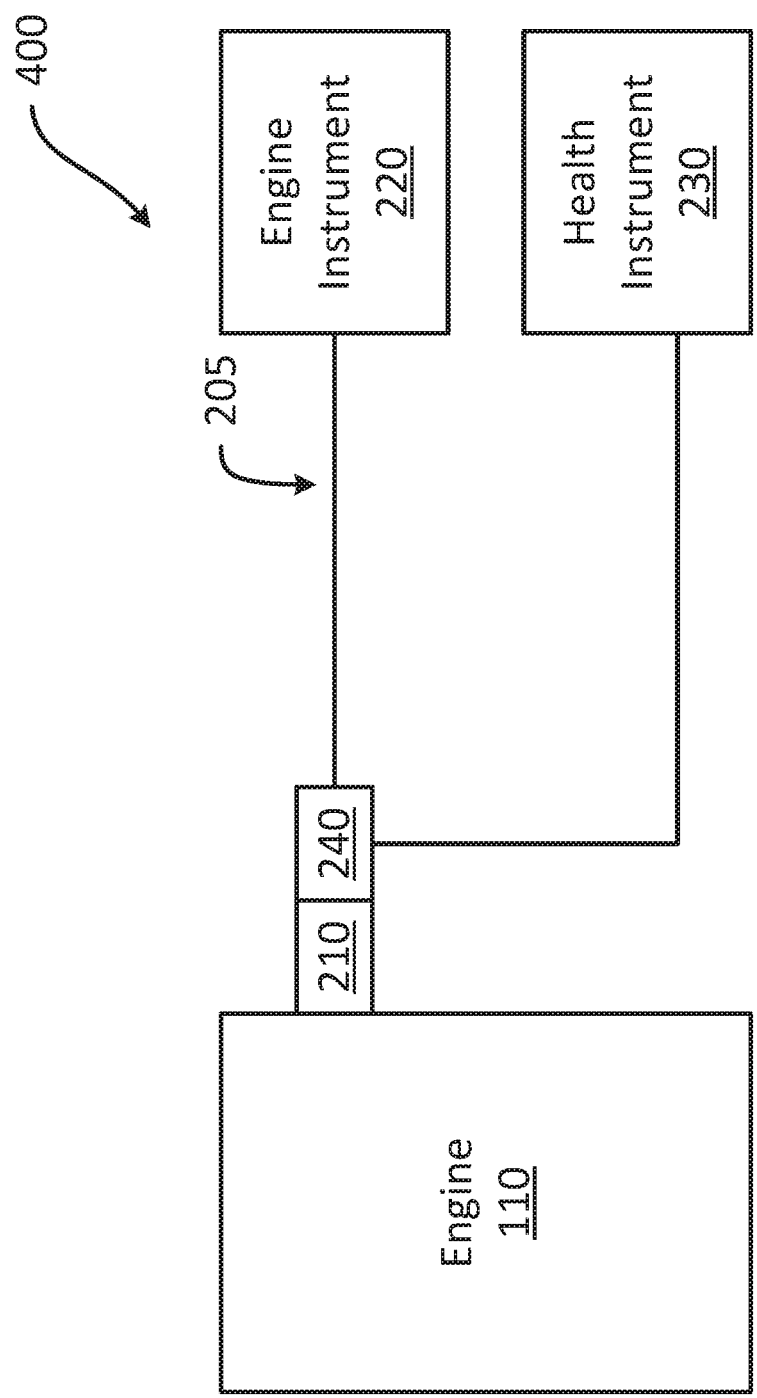

With reference to FIG. 4, there is illustrated another variant system 400 for monitoring the health of the engine 110. In the embodiment of FIG. 4, the health evaluation device 240 is coupled to the controller 210. For example, the health evaluation device 240 can be coupled at a connection point between the communication link 205 and the controller 210, for instance a point where the controller 210 connects to the engine harness. In some cases, the health evaluation device 240 can intercept the operation parameter provided by the engine instrument 220 and injects a replacement signal, which is transmitted to the controller 210. In other cases, the health evaluation device 240 injects a signal to alter the operation parameter provided by the engine instrument 220, or to supersede it, for instance using a priority bit or similar priority marker.

Figure 5:
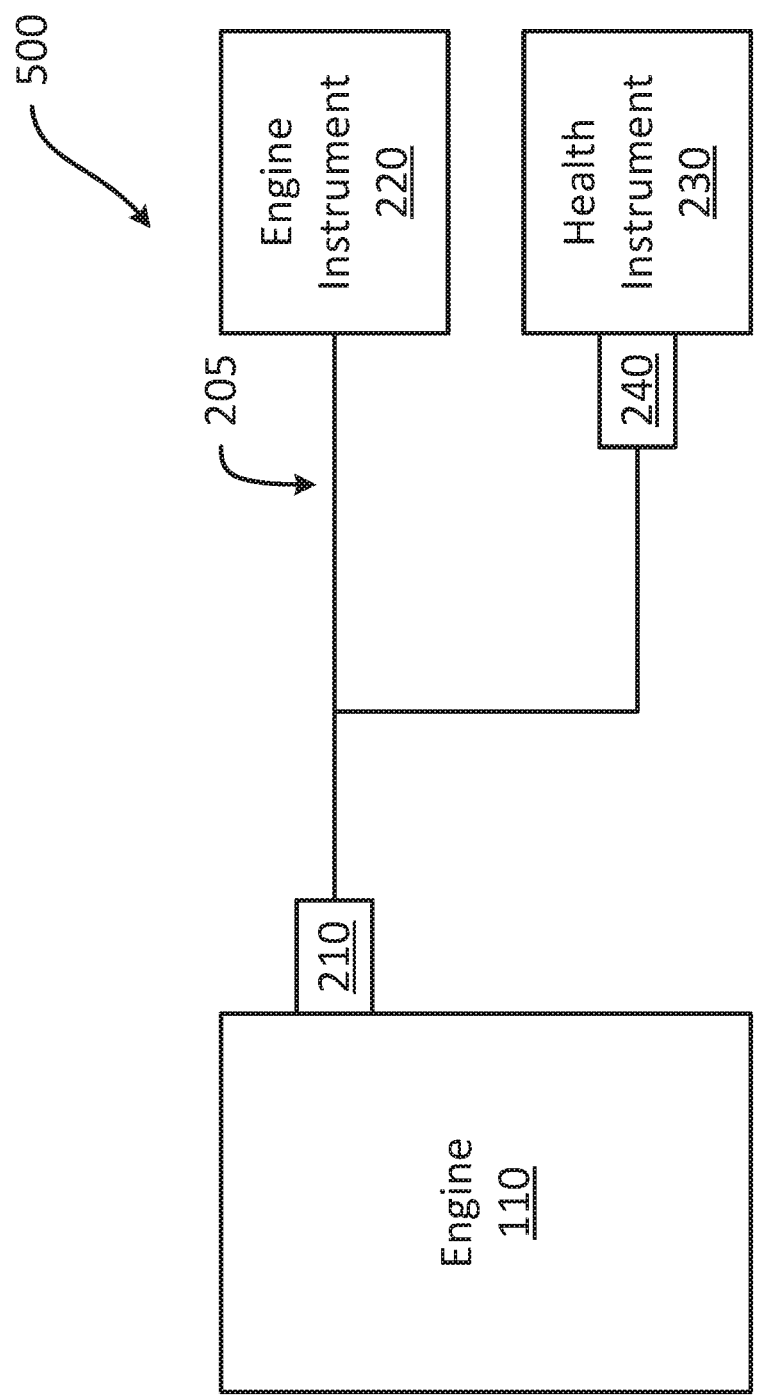

With reference to FIG. 5, there is illustrated a further variant system 500 for monitoring the health of the engine 110. In the embodiment of FIG. 5, the health evaluation device 240 is coupled to, or integrated with, the health instrument 230. For example, the health instrument 230 can be configured for monitoring the health parameter it measures, and for comparing it against the health threshold. When the health parameter is beyond the health threshold, the health evaluation device 240, forming part of, or being coupled to, the health instrument 230, can inject a signal onto the communication link 205 to alter or supersede the operation parameter provided by the engine instrument 220.

Figure 6:
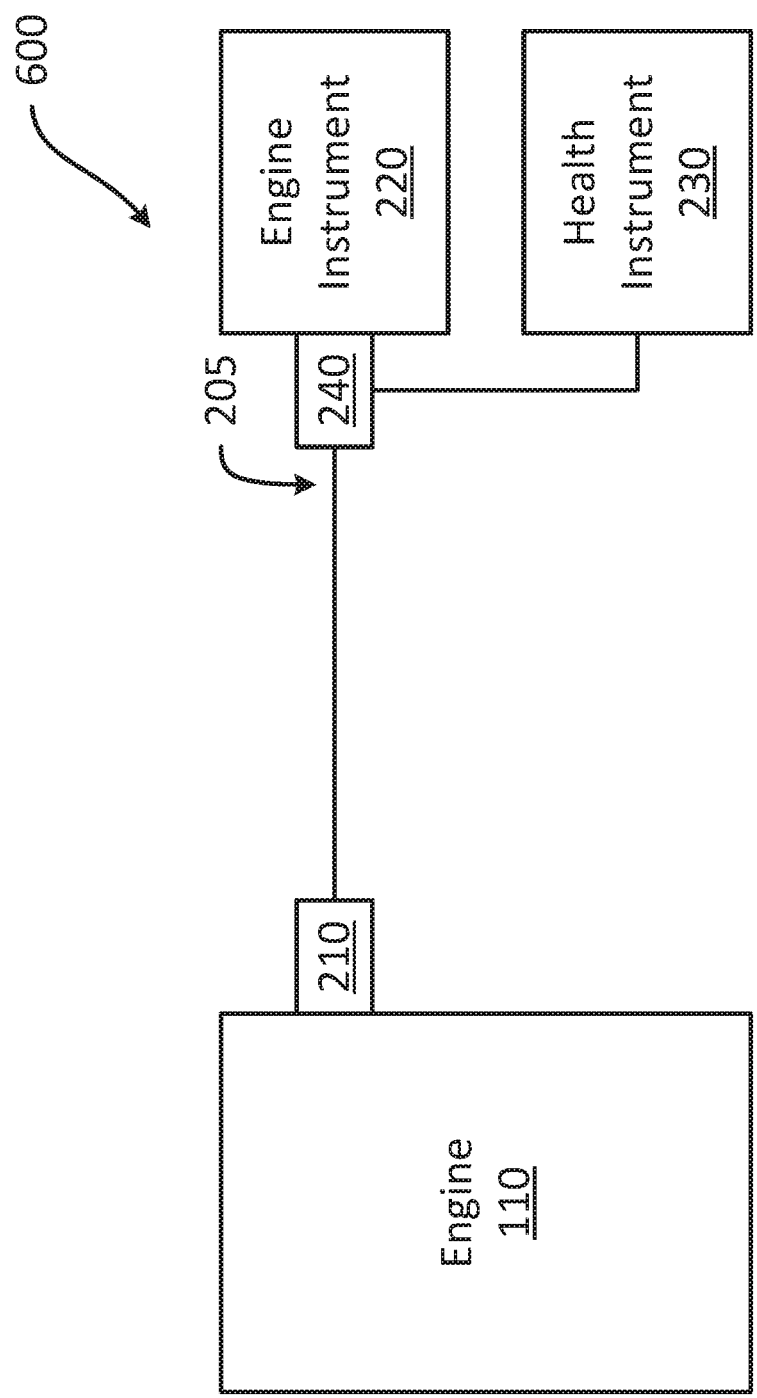

With reference to FIG. 6, there is illustrated a still further variant system 600 for monitoring the health of the engine 110. In the embodiment of FIG. 6, the health evaluation device 240 is coupled to, or integrated with, the engine instrument 220. As discussed hereinabove, in some examples, the engine 110 is operated in the context of an aircraft, which already includes the engine 110, the controller 210, an engine instrument, and the communication link 205. In the system 600, the existing engine instrument can be replaced with the new engine instrument 220, having coupled thereto, or integrated therein, the health evaluation device 240, which can then be coupled to the newly-added health instrument 230. In some other examples, the existing engine instrument 220 is maintained, and the health evaluation device 240 is coupled at a connection point between the communication link 205 and the engine instrument 220, for instance at an output of the engine instrument 220, which would connect to the engine harness. The health evaluation device 240 monitors the health parameter from the health instrument 230, and can intercept the operation parameter provided from the engine instrument 220, or can inject a signal to alter or supersede the operation parameter provided from the engine instrument 220, as appropriate.

In some embodiments, the response elicited from the controller 210 involves issuing an alert to an operator of the engine 110. For instance, the alert indicates to the operator that one or more steps should be taken to address the health issue identified by the health evaluation device 240. The health evaluation device 240 can continue to monitor the health parameter provided by the health instrument, and if the health parameter indicates that the heath issue has been addressed, either by action of the operator or otherwise, the health evaluation device 240 can stop injecting the signal onto the communication link 205.

Figure 7:
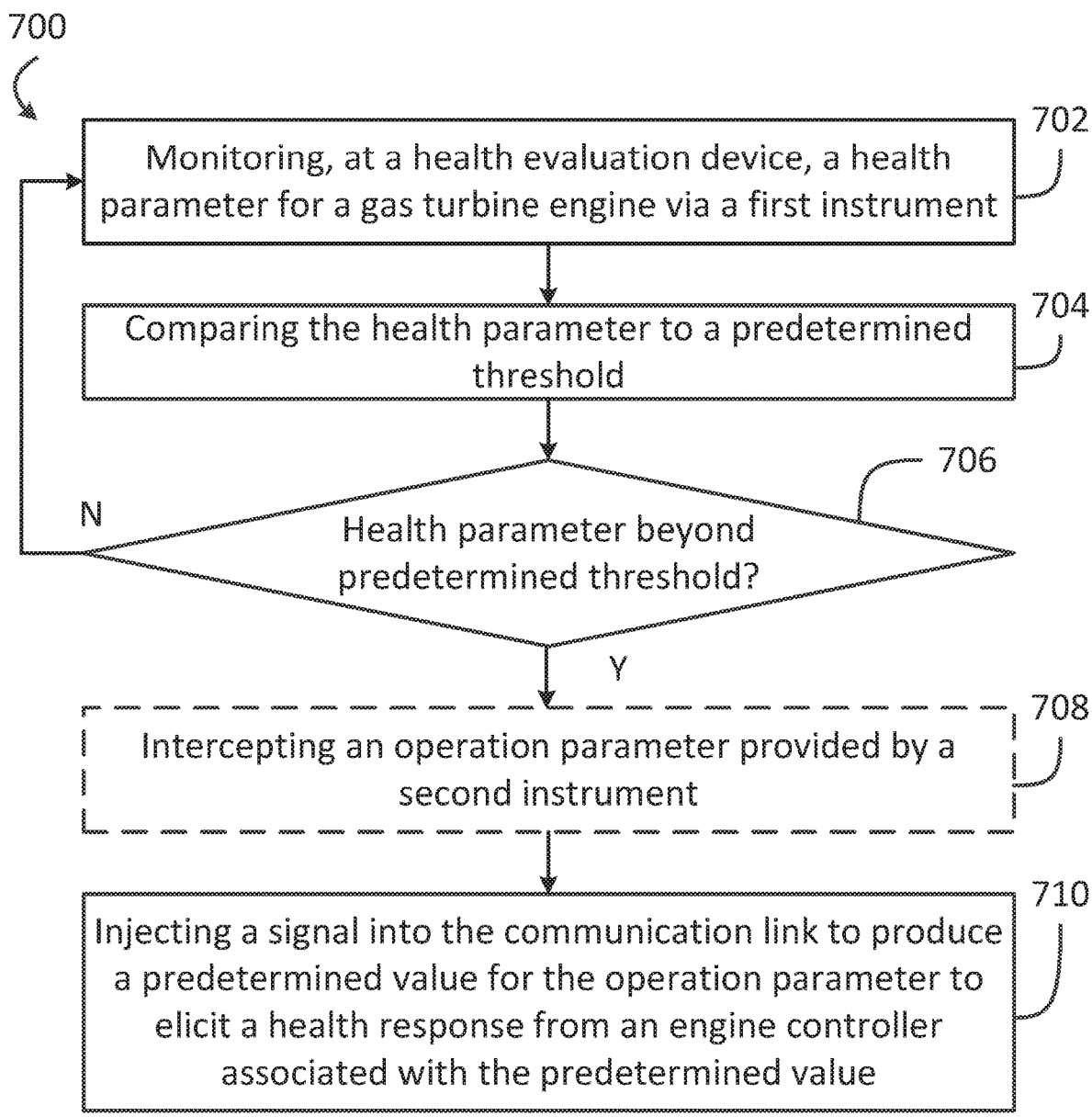
FIG. 7 is a flowchart illustrating an example method for monitoring health of a gas turbine engine.

With reference to FIG. 7, there is illustrated a flowchart for a method 700 for operating a gas turbine engine, for instance the engine 110. In some embodiments, the operating consists in, or includes, monitoring the health of the engine 110. The engine 110 can be provided with a controller, for instance the controller 210, which can receive information via a communication link, for instance the communication link 205. At step 702, a health parameter is monitored at a health evaluation device, for instance the health evaluation device 240. The health parameter can be obtained via a first instrument, for instance the health instrument 230, and can be monitored at any suitable frequency. For example, the health instrument 230 can be a vibration sensor, and the health evaluation device 240 can monitor a vibration level for the engine.

At step 704, the health parameter is compared to a predetermined threshold, for instance a health threshold associated with the health parameter and/or the health instrument 230. At decision step 706, a determination is made regarding whether the health parameter is beyond the health threshold. When the health parameter is beyond the health threshold, the method 700 moves to optional step 708, or to step 710. When the health parameter is not beyond the health threshold, the method 700 moves to some previous step, for instance step 702.

Optionally, at step 708, an operation parameter provided by a second instrument, for instance the engine instrument 220, can be intercepted, for instance by the health evaluation device 240. For example, the health evaluation device 240 can be positioned between the engine instrument 220 and the controller 210, for which the operation parameter is destined. The health evaluation device 240 can receive the operation parameter and block the operation parameter from being transmitted to the controller 210.

At step 710, a signal is injected into the communication link 205, for instance by the health evaluation device 240, to produce a predetermined value for the operation parameter. The predetermined value for the operation parameter elicits, from the controller 210, a health response associated with the predetermined value. For example, the health response can include issuing an alert to an operator of the engine 110, causing shutdown of the engine 110, altering the operating conditions of the engine 110, for instance reducing a fuel flow to the engine, or the like.

In some embodiments, the injected signal alters the operation parameter provided by the engine instrument 220. In some other embodiments, the injected signal replaces the operation parameter provided by the engine instrument 220, or supersedes it, for instance based on a priority bit or other marker.

It should be understood that at step 702, the health evaluation device 240 can monitor multiple health parameters, for instance from one or more first instruments. In addition, it should be understood that at step 704, the health parameter can be compared to multiple health thresholds, and/or that multiple health parameters can each be compared to one or more health thresholds, as appropriate. In cases where multiple health thresholds are considered, or where multiple health parameters are monitored, the health evaluation device 240 can select one of a plurality of signals to inject onto the communication link 205.

Figure 8:
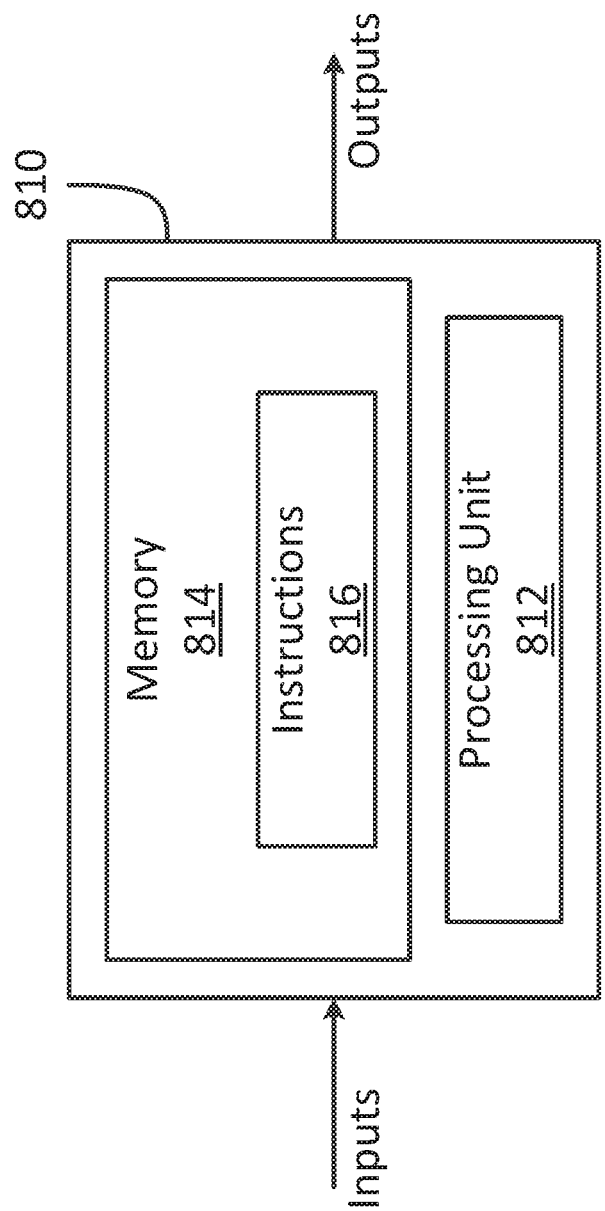
FIG. 8 is a block diagram of an example computing system for implementing the method of FIG. 7.

With reference to FIG. 8, in some embodiments, the method 700 may be implemented using a computing device 810 comprising a processing unit 812 and a memory 814 which has stored therein computer-executable instructions 816. The processing unit 812 may comprise any suitable devices configured to implement the system such that instructions 816, when executed by the computing device 810 or other programmable apparatus, may cause the functions/acts/steps of the method 700 as described herein to be executed. The processing unit 812 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, other suitable processing systems or circuits, or any combination thereof.

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812. In some embodiments, the computing device 810 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 810. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a gas turbine engine, comprising:
monitoring, by a health evaluation device, a health parameter for the gas turbine engine, the health parameter received at the health evaluation device from a first instrument, the health evaluation device being communicatively coupled to the first instrument and to a communication link established between a controller, associated with the gas turbine engine, and a second instrument which provides the controller with an operation parameter indicative of an operating condition of the gas turbine engine;
comparing, by the health evaluation device, the health parameter to a predetermined threshold; and
when the health parameter reaches the predetermined threshold, injecting, by the health evaluation device, a signal into the communication link established between the controller and the second instrument to produce a predetermined value for the operation parameter to elicit a health response from the controller associated with the predetermined value.

2. The method of claim 1, further comprising intercepting the operation parameter provided by the second instrument, wherein the signal is injected to replace the operation parameter provided by the second instrument.

3. The method of claim 1, wherein the signal is injected to alter the operation parameter provided by the second instrument to produce the predetermined value.

4. The method of claim 1, wherein the health response elicited from the controller comprises a reduction in power output of the gas turbine engine.

5. The method of claim 1, wherein the health response elicited from the controller comprises an engine shutdown.

6. The method of claim 1, wherein the health response elicited from the controller comprises issuing an alert to an operator of the gas turbine engine.

7. The method of claim 1, wherein monitoring the health parameter comprises monitoring a level of vibration experienced by the gas turbine engine.

8. The method of claim 1, wherein comparing the health parameter to a predetermined threshold comprises comparing the health parameter to a plurality of predetermined thresholds, further comprising selecting the predetermined value based on which of the plurality of predetermined thresholds the health parameter is beyond.

9. The method of claim 1, wherein monitoring the health parameter comprises monitoring a plurality of health parameters obtained from a plurality of first instruments.

10. A system for operating a gas turbine engine, comprising:
a first instrument coupled to the gas turbine engine and configured for measuring a health parameter of the gas turbine engine;
a second instrument coupled to the gas turbine engine and configured for measuring an operation parameter of the gas turbine engine;
a communication link coupling the second instrument to a controller associated with gas turbine engine to provide the operation parameter to the controller; and
a health evaluation device communicatively coupled to the first instrument to receive the health parameter as measured from the first instrument, and communicatively coupled to the communication link coupling the second instrument to the controller to inject a signal into the communication link to the controller, in response to detecting that the health parameter has reached a predetermined threshold, to produce a predetermined value for the operation parameter to elicit a health response from the controller associated with the predetermined value.

11. The system of claim 10, wherein the health evaluation device is integrated into the first instrument.

12. The system of claim 10, wherein the health evaluation device is integrated into the second instrument, wherein the health evaluation device is configured to prevent transmission of the operation parameter from the second instrument, and wherein the signal is injected to replace the operation parameter.

13. The system of claim 10, wherein the health evaluation device is integrated into the second instrument, and wherein the signal is injected to alter the operation parameter provided by the second instrument to produce the predetermined value.

14. The system of claim 10, wherein the health evaluation device is communicatively coupled between the controller and the second instrument, wherein the health evaluation device is configured for intercepting the operation parameter provided by the second instrument, and wherein the signal is injected to replace the operation parameter provided by the second instrument.

15. The system of claim 10, further comprising at least one third instrument configured for measuring at least one additional operation parameter of the gas turbine engine, wherein the health evaluation device is configured to produce the predetermined value for the operation parameter and/or the at least one additional operation parameter based on comparing the health parameter to the predetermined threshold.

16. The system of claim 10, wherein the communication link comprises an engine harness.

17. The system of claim 16, wherein the health evaluation device is integrated into the engine harness, wherein the health evaluation device is configured for intercepting the operation parameter provided by the second instrument, and wherein the signal is injected to replace the operation parameter provided by the second instrument.

18. The system of claim 16, wherein the health evaluation device is integrated into the engine harness, and wherein the signal is injected into the communication link to alter the operation parameter provided by the second instrument to produce the predetermined value.

19. A health evaluation device for a gas turbine engine, comprising:
an input connectable to a first instrument for obtaining therefrom a health parameter for the gas turbine engine;
an output connectable to a communication link established between a controller, associated with the gas turbine engine, and a second instrument which provides the controller with an operation parameter indicative of an operating condition of the gas turbine engine; and a processing circuit coupled to the input and to the output, the processing circuit configured for:
monitoring the health parameter;
comparing the health parameter to a predetermined threshold; and
when the health parameter reaches the predetermined threshold, injecting, via the output, a signal into the communication link established between the controller and the second instrument to produce a predetermined value for the operation parameter to elicit a health response from the controller associated with the predetermined value.

20. The health evaluation device of claim 19, wherein the health evaluation device is integrated into an engine harness which composes at least part of the communication link.

* * * * *